July 21, 1959    G. W. JACKSON    2,895,744
AIR-OIL SUSPENSION UNIT WITH RIDE HEIGHT CONTROL
Filed June 25, 1956
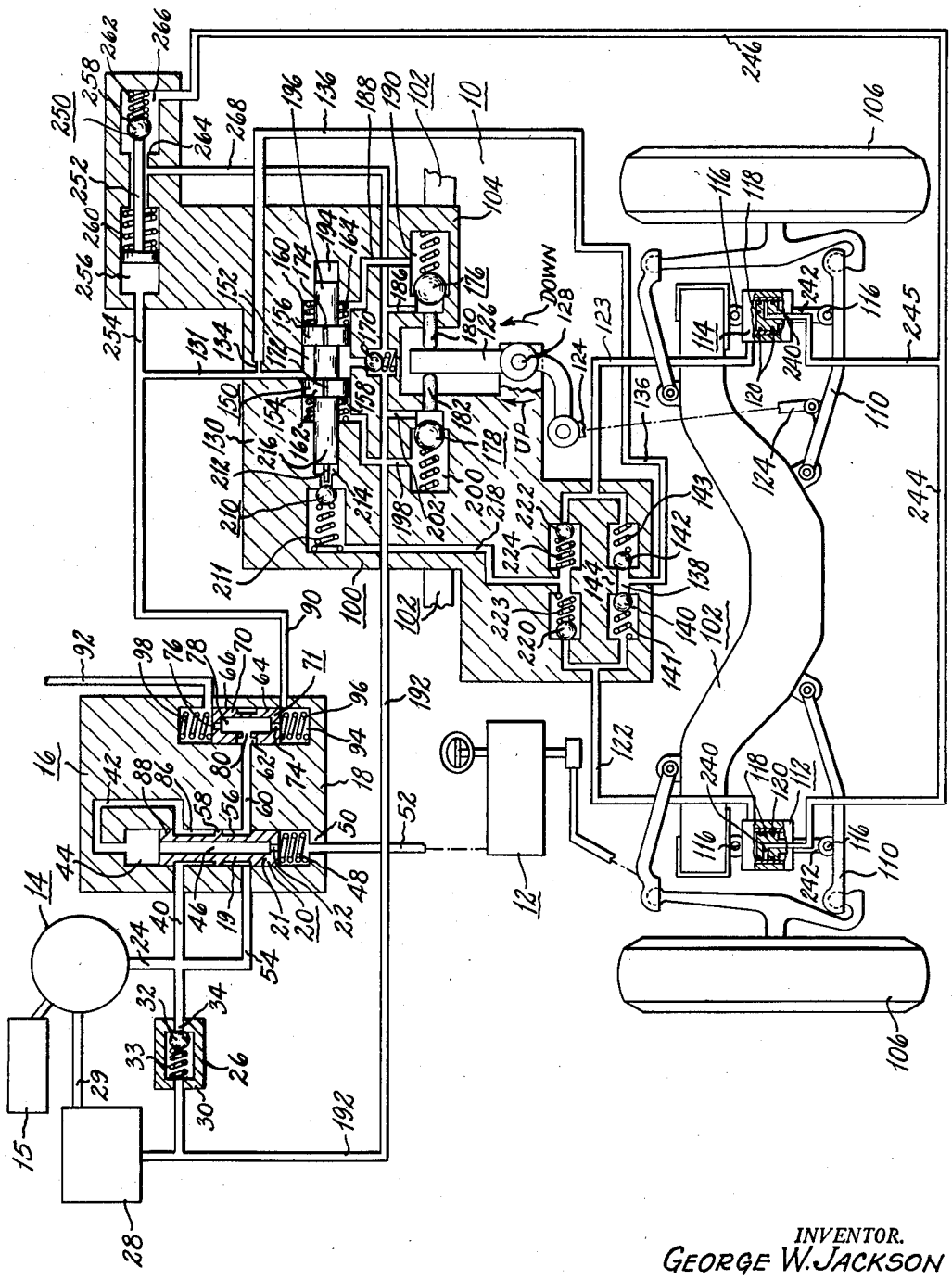
INVENTOR.
GEORGE W. JACKSON
BY
D. C. Staley
ATTORNEY United States Patent Office 2,895,744
Patented July 21, 1959

2,895,744

AIR-OIL SUSPENSION UNIT WITH RIDE HEIGHT CONTROL

George W. Jackson, Dayton, Ohio, assignor to General Motors Corporation, Detroit, Mich., a corporation of Delaware Application June 25, 1956, Serial No. 593,610

10 Claims. (Cl. 280—124)

This invention relates to a control system for supplying hydraulic fluid, and particularly to a hydraulic supply system for both a power steering mechanism and vehicle suspension means adjustable to maintain a predetermined clearance height between a sprung mass and an unsprung mass of a vehicle.

An object of the invention is to provide a hydraulic control system adapted for utilizing a power steering pump supplying fluid to maintain a predetermined clearance height in a suspension unit between a sprung mass and an unsprung mass of a vehicle always subservient to a power steering system.

Another object is to provide a hydraulic control system arranged to give complete preference to a power steering system so that it will at no time become subservient to a ride height control system but rather the ride height control system is subservient to the power steering control system.

Another object is to provide a flow sensitive control means in series with a main fluid supply line to a power steering system so that power steering fluid requirements are given preference over fluid requirements of a fluid spring suspension system by cut off of fluid supply to the suspension system when steering requirements so dictate.

Another object is to provide a hydraulic control system supplying fluid to both a power steering system and a fluid spring suspension system with a control valve for the suspension system having multiple passages and valving mechanism operable to regulate clearance height between sprung and unsprung masses of a vehicle utilizing leakage about peripheral portions of a movable spool of the valve to effect predetermined pressure in chambers on opposite sides of the spool equal to supply pressure but variable by change of clearance height to effect increase of supply pressure to supply lines connected with suspension units for return to proper clearance height or to effect intermittent discharge of fluid from the units when height exceeds the predetermined positioning of the sprung and unsprung masses relative to each other thereby preventing sudden dumping of fluid from the suspension units.

Another object is to provide a hydraulic control system supplying fluid to both a power steering system and a suspension system using a flow sensitive valve maintaining the suspension system subservient to the power steering system while a suspension control valving regulates fluid supply to suspension units between a sprung mass and an unsprung mass of a vehicle at a predetermined clearance height using fluid supply and discharge conduit means with the units cooperable with a first check valve associated with the valving and a second check valve with leakage lines connected with space between high pressure seals of a piston within the units to prevent settling of the sprung mass below the predetermined clearance height and to lock fluid in the units when a pump in the power steering system is not operating.

Another object is to provide a control valve for a hydraulically operable vehicle system providing a movable spool therewith forming chambers connectable by valving mechanism to a drain passage for effecting either supply of fluid pressure to a fluid expansible suspension unit between a sprung mass and an unsprung mass of a vehicle or intermittent exhaust of fluid therefrom.

Further objects and advantages of the present invention will be apparent from the following description, reference being had to the accompanying drawing, wherein a preferred embodiment of the present invention is clearly shown.

In the drawing:

The accompanying drawing shows a schematic diagram of a hydraulic control system embodying the present invention.

More specifically, the diagram shows a first hydraulically operable mechanism or air-oil suspension system generally indicated by the numeral 10, and a second hydraulically operable mechanism or power steering system, generally indicated by the numeral 12. A source of fluid pressure or preferably a power steering pump generally indicated by the numeral 14 provides fluid under pressure to operate the power steering system and the suspension system depending upon pressure demand regulated by a control means, generally indicated by the numeral 16. The control means 16 includes a body 18 with recess structure in which a valve spool 19 of a flow sensitive control means, generally indicated by the numeral 20, is operably disposed. The valve spool 19 includes a land portion 21 at one end having a restricted passage or opening 22 therein. The purpose of the flow sesitive control means 20 is to assure that the power steering system is never subservient to the suspension or ride height control system 10.

The power steering pump 14 operably connected to a vehicle motor 15 supplies fluid or oil under pressure through an outlet line 24. A conventional high pressure blow off valve, generally indicated by the numeral 26, is provided between the outlet line 24 and a fluid reservoir 28. A line 29 connects the reservoir with the power steering pump. The blow off valve 26 includes a housing 30 and a ball check valve member 32 biased by a spring means 33 into seating engagement with one side of the housing 30 to normally close off an opening 34 except when bypass of excess pump discharge fluid flow is required to the reservoir.

The main supply of oil or fluid to the power steering system passes through a line 40 from line 24 to a passage 42 formed within the body 18 of control means 16. The passage 42 connects with a chamber 44 through which fluid enters at one end of the spool 19. The spool 19 is formed with a hollow interior space or longitudinally extending cavity 46 communicating with the restricted opening 22. A predetermined pressure is built up in the chamber 44 normally biasing the spool 19 to the position shown in the diagram against a force from a spring 48 normally urging the spool upwardly or into the chamber 44 away from a wall portion 50 of the valve body 18 engaged by the spring. A conduit or supply line 52 feeds the fluid to the power steering system for operation thereof in a conventional manner. The restricted opening 22 is in series between the chamber 44 and cavity 46 with supply line 52. So long as the flow to the power steering system is at a predetermined volume, the spool valve 20 remains in the position shown in the drawing. In this position, the flow sensitive valve 20 permits excess hydraulic fluid from the pump 14 to pass through a shunt line 54 through an annular chamber 56 formed between the land 21 and an intermediate land 58 of the spool 19. From the annular chamber 56 the fluid enters a line 60 supplying fluid to an annular chamber 62 formed between lands 64 and 66 of a spool or plunger 70 of an equalizing valve generally indicated by the numeral 71. The plunger 70 is provided with restricted openings 74 and 76 at opposite ends thereof communicating with the annular chamber 62 through an internal space 78 and a passage 80 adjacent the lands 64 and 66 at one side of the plunger 70.

The annular space 56 between lands 21 and 58 of the spool 19 of flow sensitive control means 20 normally permits fluid flow between the line 54 and conduit or passage 60 in the body 18. However, should the line 60 withdraw fluid from the pump 14 at a greater rate than the minimum flow required through the line 42 to chamber 44 to maintain the spool 19 of flow sensitive control means 20 in the position shown in the diagram, the spring 48 will exert a force greater than the pressure applied through chamber 44 and the hollow interior space 46 against the series restricted opening 22 permitting the spool 19 to shift its position causing the land 21 to close or cut off communicating flow between the line 54 and passage 60. When land 21 blocks passage between these lines, the annular chamber 56 is no longer in communication between the lines 54 and 60 but an annular chamber 86 formed between intermediate land 58 and a land 88 at the end of the spool opposite the opening 22 is provided to permit continued flow from the line 40 to the line or passage 42 in body 18. Thus, all available fluid pressure from the pump 14 is delivered to the power steering system by the lines and passages described above depending upon rate of flow as determined by flow sensitive control means 20.

Fluid under pressure, when available in volume exceeding the requirements of the power steering system, is delivered from the line 60 through the annular chamber 62 by way of openings 74 and 76 of the spool or plunger 70 in the equalizing valve 71 to either front or rear fluid supply lines 90 or 92 respectively, for the suspension system as described below. Pressure differentials effected in the supply lines 90 and 92 to front and rear suspension system control valves will effect movement of the spool 70 to maintain the supply of oil in the active control valve. The spool 70 is reciprocable in a recess or chamber 94 of the body 18 with a pair of balance springs 96 and 98 maintaining the spool 70 in a self-centered position within the recess 94. When the spool 70 is in the position shown in the drawing, equal flow of fluid is delivered to both the front and rear supply lines 90 and 92.

The drawing shows a front control valve, generally indicated by the numeral 100, connected to supply line 90. It is to be understood that a similar control valve is to be connected to the rear supply line 92. This control valve can be suitably mounted on a sprung mass or frame 102 of a vehicle by a valve body 104 containing various valving mechanisms to be described in detail below. To facilitate understanding of the operation of the suspension system in conjunction with the power steering system, a schematic representation of a front end suspension on a motor vehicle is shown including wheels 106 rotatably journalled in a conventional manner for vertical movement by means of an unsprung mass, generally indicated by the numeral 110. It is to be understood that the unsprung mass 110 can be an articulated linkage or running gear structure as illustrated, or a rear axle and differential mounting, not shown. A pair of air-oil fluid cylinder suspension units, generally indicated by the numerals 112 and 114, are suitably attached between the unsprung mass 110 and the sprung mass 102 by fittings 116. A piston 118 is reciprocally disposed in each suspension unit. Each piston is provided with high pressure static seals 120 at opposite ends thereof. Fluid supply lines 122 and 123 are connected to suspension units 112 and 114, respectively, permitting supply and exhaust of fluid therewith as determined by the control valve 100 when fluid is made available by flow sensitive control means 20.

Fluid is supplied or exhausted from the suspension units 112 and 114 in accordance with the clearance height between the sprung and unsprung masses as indicated by a pivotal connection between the sprung and unsprung masses. A link 124 is attached to the unsprung mass 110 at one end as indicated by a broken away portion in the drawing and to a bell crank arm or lever means 126 at its other end. The lever means 126 is pivotable about a pin 128 directly or indirectly attached to the sprung mass to actuate valving mechanism in the front control valve 100 for opening or closing of fluid passages in a body 130 of the control valve. In operation of the front control valve 100, fluid under pressure is delivered from the front supply line 90 to a conduit 131 to the valve body 130 and then passes through a resistance passage 134 entering line 136. The line 136 delivers fluid under pressure to a chamber 138 between ball check valves 140 and 142. The ball check valves are biased by springs 141 and 143 into seating engagement with a body portion 144 surrounding the chamber 138 by the springs to permit supply of fluid from the line 136 but preventing escape of fluid back to the chamber 138 once the ball check valves 140 and 142 are seated. Fluid passing the ball check valves 140 and 142 is admitted to the conduits 122 and 123 connected with the suspension units 112 and 114, respectively. It is to be understood that similar fluid connections to suspension units are provided with a rear control valve, not shown in the present drawing.

Fluid supplied to each suspension unit 112 and 114 determines the volume of oil governing the ride height established by each unit according to load and weight conditions between the sprung and unsprung masses of the vehicle. When the load on the vehicle increases, an increased oil pressure is required in the air-oil suspension units to maintain the predetermined ride height, and as load decreases, less oil pressure is required to establish the predetermined ride height.

The control valve 100 regulates the pressure of oil supplied to the air-oil suspension units 112 and 114 under the control of the lever means 126, which, in effect, provides a ride height indication. The lever means 126 affects the valve 100 in the following manner. The valve 100 comprises a spool 150 that cooperates with space within the valve body 130 to provide a central annular chamber 152 between a pair of lands 154 and 156. The lands separate the chamber 152 from chambers 158 and 160, respectively. Spring means or balancing springs 162 and 164 are disposed in the chambers 158 and 160, respectively, to provide self-centering of the spool 150 relative to the chambers 158 and 160. A pressure relief valve 170 is provided on the discharge side of the chamber 152 to maintain a predetermined pressure in the supply line 90 and conduit 131. This pressure relief valve maintains a predetermined oil pressure through the restriction 134 in the supply lines 136, 122 and 123 to the individual suspension units 112 and 114 thereby maintaining a predetermined ride height.

The lands 154 and 156 of the spool 150 are each adapted to permit a certain amount of leakage around their periphery, or by a leakage path schematically illustrated by passages 172 and 174, respectively, to effect a predetermined pressure in the chambers 158 and 160 that is substantially the same as in the supply line 90. The chamber 160 is connected with a relief valve generally indicated by the numeral 176. The chamber 158 is connected with a relief valve generally indicated by the numeral 178. Relief valve 176 is adapted to be unseated or opened by a pin 180 while the relief valve 178 is adapted to be unseated or opened by a pin 182. Pins 180 and 182 are actuated to engage and open valves 176 and 178 in response to movement transmitted by lever means 126 about pivot point 128 in response to change of clearance height between the sprung and unsprung masses of the vehicle. As indicated by arrows marked "up" and "down," a clockwise movement about the pivot 128 actuates the pin 180 affecting the relief valve 176, whereas a counterclockwise movement affects the valve 178 through pin 182.

As a load in the vehicle increases, the ride height maintained by the suspension units will decrease thereby causing the lever means 126 to move the pin 180 for unseating the pressure relief valve 176 to permit pressure in the chamber 160 to bleed off into a reservoir return line 186 by way of conduit 188 connecting the chamber 160 through a chamber 190 to the line 186. The reservoir return line 186 connects with a drain line 192 connected to the reservoir 28. When pressure is relieved in the chamber 160, the pressure in the chamber 158 combined with the force of spring 162 causes the spool 150 to move to the right against the action of a dashpot chamber 194 formed in the body 130 and cooperable with a rod portion 196 of the spool 150. This shifting movement of spool 150 against fluid trapped in the dashpot chamber 194 restricts the flow of fluid through the annular chamber 152 as the land 154 blocks the conduit 131. As a result, pressure increases in the supply line 90 and conduit 131 forcing a greater flow of fluid through the restriction 134 into the conduit 136 and through the check valves 140 and 142 to the suspension units 112 and 114. This increase in pressure effects an increase in fluid volume in the units 112 and 114 which re-establishes the predetermined clearance height between the sprung and unsprung masses as indicated by the lever means 126 in returning to a neutral or center position between the pins 180 and 182. The pressure relief valve 176 does not close until the fluid pressure and volume in the suspension units 112 and 114 maintains the predetermined clearance height.

When the load in the vehicle becomes lighter, pressure must be relieved from the suspension units 112 and 114 because the excessive pressure and fluid volume therein effects excessive clearance height between the sprung and unsprung masses. When the body or sprung mass of the vehicle rises relative to the axle or unsprung mass, indicating an above normal ride height, the lever means 126 moves in a counterclockwise direction about the pivot 128 to move pin 182 into engagement with the relief valve 178 to unseat the valve and open the following passages. The relief valve 178 when open connects the chamber 158 through a passage 198 to a chamber 200 communicating through a line 202 with the drain passage 192 connected with the reservoir 28. When pressure is relieved in the chamber 158, the spool 150 moves in a leftward direction as shown in the diagram to unseat a secondary relief valve, generally indicated by the numeral 210, by means of a rod 212 formed on the end of the spool opposite dash chamber 194. This connects a chamber 214 formed between a cylindrical portion or stem 216 of the spool and a line 218 with a pair of check valves 220 and 222. The check valves 220 and 222 control communication between the lines 122 and 123 with the line 218 from suspension units 112 and 114, respectively.

When the spool 150 is shifted in a leftward direction, fluid bleeds around the check valves 220 and 222 from suspension units 112 and 114 through the conduit 218 around the secondary pressure relief valve 210 into the chamber 214 past the cylindrical portion or stem 216 of the spool 150 into the chamber 158 for return to the reservoir return line 192 by way of the conduit 198, chamber 200 around relief valve 178 and line 202. As long as the clearance height exceeds the predetermined value to be maintained by the suspension system 10, the pin 182 continues to unseat the relief valve 178 for exhaust or drainage of fluid from the suspension units 112 and 114 through the check valves 220 and 222 and secondary pressure relief valve 210 as described. Because valve 210 closes as chamber 214 fills with fluid escaping under pressure from the suspension unit, draining occurs intermittently as spool 150 is periodically shifted to the left. Fluid leaks about the periphery of stem 216 to chamber 158 to drain. Each time the spool 150 shifts to the left because valve 178 permits escape of fluid from chamber 158, the intermittent draining repeats until the lever means 126 returns to a neutral position indicating proper clearance height. The purpose of the intermittent draining action as permitted by the valving mechanism described is to prevent oil or fluid from suddenly dumping from the suspension units 112 and 114 to effect excessive dropping of the sprung mass relative to the unsprung mass as the relief valve 210 bleeds oil into the chamber 214 at high pressure thereby moving the spool 150 in a right hand direction to again permit the relief valve 210 to close. Check valves 220 and 222 are urged to a closed position by springs 223 and 224, respectively. Closing of the secondary relief valve 210 by spring 211 and by fluid pressure from suspension units 112 and 114 locks in fluid in the units except when conditions described above open the valve 210 through spool 150.

If the first volume of fluid released by the secondary pressure relief valve 210 is insufficient to correct clearance height to the proper level as indicated by lever means 126 to close valve 178 when pressure is relieved from the chambers 214 and 158, the spool 150 will again move in a left hand direction to re-open the relief valve 210 permitting another small volume of fluid under pressure to be discharged from the suspension units 112 and 114. This "hunting action" continues until the height indicating lever means 126 returns to a normal or neutral position at which time relief valve 178 is closed and the spool 150 is again in its balanced position with fluid in chambers 158 and 160 together with springs 162 and 164 assuring centering thereof.

Because the pistons 118 within the suspension units 112 and 114 must reciprocate to accommodate varying volumes of fluid as supplied by the suspension system for controlling clearance height between sprung and unsprung masses, the high pressure sealing rings 120 are provided on opposite ends of each piston 118. However, due to difficulty encountered in effecting a perfect seal, a certain amount of constant leakage occurs around the periphery of each piston 118. Therefore, passages 240 are provided in each of the pistons 118 connectable through piston rods 242 attached to each piston with a conduit line 244 and 245 from suspension units 112 and 114, respectively. Lines 244 and 245 are connected through a line 246 to a ball check valve generally indicated by the numeral 250. Normally when the pump 14 is operating and pressure is present in the supply line 90, an actuator 252 associated with valve 250 is forced by fluid pressure supplied through line 254 to a chamber 256 in the body 130 to force a ball member 258 of the check valve 250 from its seat against the bias of springs 260 and 262. With the ball member 258 disengaged from its seat 264, fluid may pass from the line 246 through a check valve chamber 266 to line 268 connected to the reservoir return line 192. Thus, as long as fluid pressure is supplied from the pump 14 leakage passing about the periphery of pistons 118 in the suspension units 112 and 114 is continuously returned by suitable conduit lines to the reservoir 28.

This leakage relief line arrangement serves an additional purpose in that when the pump 14 stops, the ball check valve 250 closes because fluid is no longer available in chamber 256 to unseat ball member 258. Then the leakage past the seals 120 passing to the line 246 aids spring 262 in seating the ball member 258 against seat 264. The result is a prevention of leakage of high pressure fluid from the volume contained in the suspension units 112 and 114 together with an elimination of the need for using high friction material in the seals 120 as high pressure static seals. Elimination of high pressure seals decreases the heat generated in the suspension units 112 and 114 by variations in the volume of fluid contained therein to provide a further advantage in the present system.

In addition to the closing of relief valve 250 to prevent escape of fluid from the suspension units 112 and 114 when the pump 14 stops, the conduits 122 and 123 are connected through check valves 220 and 222 with passage 218 in the body 130 causing fluid under pressure to be applied to the secondary relief valve 210. This fluid pressure applied to the valve 210, together with the spring 211 forcing the ball member of the valve into seating engagement with an opening communicating with the chamber 214 prevents escape of fluid by the intermittent or "hunting" action, because the spool 150 cannot be shifted to dislocate or re-open the secondary valve 210 once the pump 14 no longer supplies fluid to chamber 152. Thus valves 210 and 250 cooperate to lock fluid in the suspension units 112 and 114 when the power steering pump 14 is not operating. With escape of fluid prevented as described, the volume of fluid in the suspension units 112 and 114 is trapped to prevent settling of the sprung mass toward the unsprung mass when the vehicle is at rest.

While the embodiment of the present invention as herein disclosed constitutes a preferred form, it is to be understood that other forms might be adopted.

What is claimed is as follows:

1. A control valve for a hydraulically operable vehicle suspension system including a source of fluid supply, comprising, a valve body connected by conduits to the source with a supply line connectable with a chamber formed within said body, a valve spool having a pair of lands forming the chamber therebetween with said body connectable to the supply line, said spool forming a pair of chambers at opposite ends thereof and having a land separating the chambers relative to each other, a first pressure relief valve connected by a passage with the chamber at one end of said spool capable of being opened in response to change of clearance height between a sprung mass and an unsrpung mass of the vehicle to supply fluid to the system, a second pressure relief valve in said body connected by a passage with the chamber at the opposite end of said spool capable of being opened in response to change of clearance height to exhaust fluid from the system, stem portions on said spool located in the chambers on opposite ends of said spool, one of said stem portions cooperating with a damping chamber at one side of said spool, and a secondary relief means in the valve body engageable by said stem portion on the opposite end of said spool to intermittently open exhaust flow from the suspension system through said second relief valve when clearance height between the sprung and unsprung masses exceeds the value to be maintained.

2. In combination with a control system having a control valve for a hydraulically operable vehicle suspension system inducting a source of fluid supply, comprising, a valve body connected by conduits to the source with a supply line connectable with a central chamber formed within said body, a valve spool having a pair of lands forming the central chamber therebetween with said body connectable to the supply line, a pair of lands on said spool forming a pair of chambers at opposite ends thereof separate from the supply-line-connected chamber formed between said lands, a first pressure relief valve connected by a passage with the chamber at one end of said spool, spring means in each chamber at opposite ends of said spool exerting self-centering forces on said spool, a drain conduit connectable by said first pressure relief valve in response to an indication of clearance height between a sprung mass and an unsprung mass of the vehicle, a fluid expansible suspension unit connected between the sprung and unsprung masses for maintaining a predetermined clearance height support therebetween, a conduit having a restriction therein connecting said suspension unit with the supply line and supplying increased fluid pressure to said unit when the one chamber is connected to drain by said first relief valve, a second pressure relief valve in said body connected by a passage with the chamber at the opposite end of said spool capable of being opened in response to change of clearance height to exhaust fluid from the chamber, a cylindrical portion on one side of said spool extending into the chamber at one end thereof, a secondary relief valve normally closed to prevent escape of fluid from said suspension unit through a conduit connected therebetween, and a rod extending longitudinally from said cylindrical portion of said spool movable into drain-passage opening engagement with said secondary relief valve upon connection of the chamber at one end of said spool to drain by said second pressure relief valve, said cylindrical portion of said spool effecting a leakage through the chamber at one end of said spool to periodically interrupt exhaust of fluid from said unit assuring against sudden dropping of the sprung mass relative to the unsprung mass as fluid is exhausted from said unit.

3. A control valve for a hydraulically operable suspension system including a source of fluid supply, comprising, a valve body connected by a conduit to the source with a supply passage, a valve spool having a pair of lands forming a central chamber therebetween with said body connectable to the supply passage, said spool forming a pair of chambers at opposite ends thereof, said pair of lands on said spool separating the chambers from the central chamber, said lands permitting limited peripheral leakage from the central chamber to the end chambers maintaining fluid pressure equal in the chambers relative to each other, an excess discharge pressure relief valve capable of connecting the central chamber to a drain passage, first and second pressure relief valves each connected by a passage to one chamber at opposite ends of said spool, said relief valves being closed so long as a predetermined clearance height is maintained between a sprung mass and an unsprung mass of a vehicle and being opened individually to connect to drain one of the end chambers formed by said spool and said body, and spring means in each end chamber engageable between said body and said spool to effect self-centering of said spool relative to the chambers, one of the lands of said spool shifting to cut off fluid communication between the supply passage and said excess discharge pressure relief valve when said first relief valve connects the one end chamber to drain thereby forcing fluid under pressure through a restriction in a supply line to the suspension system to increase the predetermined clearance height.

4. In combination with a control system for regulation of supply and exhaust of operating fluid to and from a hydraulically operable system, a control valve, comprising, a valve body, a valve spool forming multiple chambers with said body, valving mechanism operable in response to changes of clearance height between a sprung mass and an unsprung mass to connect certain of the chambers to drain and thereby shifting said spool to effect supply and exhaust of fluid relative to the hydraulically operable system, a suspension unit including a cylinder and piston reciprocal therein connected between the sprung and unsprung masses, sealing rings between said piston and said cylinder, and a check valve connected by a line to a passage in said piston open to drain for passing leakage fluid escaping between said rings away from said suspension unit so long as operating fluid is available and closing to prevent settling of the sprung mass relative to the unsprung mass when operating fluid is not available.

5. A control system for regulation of supply and exhaust of operating fluid to and from lines of both a first continuously live and operable hydraulic system and second continuously live and operable fluid suspension system hydraulically actuated on a vehicle, comprising, a fluid source connected to supply fluid pressure to first and second supply lines of said first and second continuously live and operable hydraulic systems, a flow sensitive valve means in the supply line of said first continuously live and operable hydraulic system providing a predetermined volume flow rate thereto, and a flow control valve means receiving fluid flow from said flow sensitive valve means continuously regulating fluid demand of said second continuously live and operable hydraulic system and including valve means maintaining a predetermined minimum fluid pressure in said second system, said flow control valve means modifying the said fluid pressure in the said fluid suspension system, said flow sensitive valve means blocking supply of fluid pressure to said second continuously live and operable hydraulic system which is thereby made always subservient to said first continuously live and operable hydraulic system whenever said fluid source is incapable of adequately supplying both said continuously live hydraulically operable systems simultaneously.

6. A control system for supply of fluid under pressure to a power steering system and a suspension system both hydraulically operable, comprising, a hydraulic pump operably connected to supply fluid under pressure from a reservoir to both a power steering system and a suspension system, flow sensitive control means connected between said pump and the individual systems to make the suspension system entirely subservient to the power steering system, a control valve with the suspension system connected to said flow sensitive control means for receiving fluid under pressure therefrom for regulating clearance height of a sprung mass relative to an unsprung mass of a vehicle, conduit means connected between said flow sensitive control means and said control valve conducting fluid under pressure to the suspension system, said control valve including a valve body formed with multiple passages, and a self-centering spool reciprocally disposed in a chamber of said valve body to regulate passages to increase pressure of fluid to the suspension system when clearance height decreases below a predetermined clearance height and to intermittently open and close passages for exhausting fluid from the suspension system when clearance height increases above the predetermined clearance height.

7. A control system for supply of fluid under pressure to a power steering system and a suspension system both hydraulically operable, comprising, a hydraulic pump operably connected to supply fluid under pressure from a reservoir to both a power steering system and a suspension system, flow sensitive control means connected between said pump and the individual systems to make the suspension system entirely subservient to the power steering system, a control valve with a suspension system connected to said flow sensitive control means for receiving fluid under pressure therefrom for regulating clearance height of a sprung mass relative to an unsprung mass of a vehicle, pressure actuated valve means connected between said control valve and said pump to maintain a predetermined minimum fluid pressure between said control valve and said flow sensitive control means, conduit means connected between said flow sensitive control means and said control valve conducting said fluid pressure of predetermined minimum value to the suspension system whereby to maintain said suspension system normally with a predetermined clearance height between a sprung mass and an unsprung mass of the vehicle, said control valve including a valve body formed with multiple passages and a self-centering spool reciprocably disposed in a chamber of said valve body to regulate through passage means connected with said pressure actuated valve to increase pressure of fluid between said control valve and said flow sensitive control means, and thereby in said conduit delivering said fluid pressure to said suspension system when clearance height decreases below a predetermined clearance height, said control valve also opening and closing passages for exhausting fluid from the suspension system when clearance height increases above the predetermined clearance height.

8. A control system for supply of fluid under pressure to a power steering system and a suspension system both hydraulically operable, comprising, a hydraulic pump operably connected to supply fluid under pressure from a reservoir to both a power steering system and a suspension system, flow sensitive control means connected between said pump and the individual systems to make the suspension system entirely subservient to the power steering system, a control valve with a suspension system connected to said flow sensitive control means for receiving fluid under pressure therefrom for regulating clearance height of a sprung mass relative to an unsprung mass of a vehicle, pressure actuated valve means connected between said control valve and said pump to maintain a predetermined minimum fluid pressure between said control valve and said flow sensitive control means, conduit means connected between said flow sensitive control means and said control valve conducting said fluid pressure of predetermined minimum value to the suspension system whereby to maintain said suspension system normally with a predetermined clearance height between a sprung mass and an unsprung mass of the vehicle, said control valve including a valve body formed with multiple passages and a self-centering spool reciprocably disposed in a chamber of said valve body to regulate through passage means connected with said pressure actuated valve to increase pressure of fluid between said control valve and said flow sensitive control means, and thereby in said conduit delivering said fluid pressure to said suspension system when clearance height decreases below a predetermined clearance height, said control valve including an auxiliary control valve actuated intermittently by said spool to open and close passage means for passage of fluid from the said suspension system when clearance height increases above the predetermined clearance height.

9. A control system for supply of fluid under pressure to a power steering system and a suspension system both hydraulically operable having the arrangement set forth in claim 7 that includes flow control valve means connected between the suspension units of the suspension system and the reservoir and actuated to open the valve means in response to fluid pressure between said control valve and said flow sensitive control means for return of fluid from the suspension units to the pump when the pump is active, but which valve closes when the pump is inactive whereby to lock hydraulic fluid in the suspension units during inactivity of the pump.

10. A control system in accordance with claim 9 wherein the connection of the flow control valve means with the suspension units is between seal elements of the suspension units to relieve fluid pressure on the seal elements while the pump is active and to provide for locking of hydraulic fluid between the seal elements when the pump is inactive.

References Cited in the file of this patent

UNITED STATES PATENTS

| | | |
|---|---|---|
| 2,674,092 | Gardiner | Apr. 6, 1954 |
| 2,687,311 | Nallinger | Aug. 24, 1954 |
| 2,737,196 | Eames | Mar. 6, 1956 |